(12) United States Patent
Sugiyama et al.

(10) Patent No.: US 8,320,404 B2
(45) Date of Patent: Nov. 27, 2012

(54) WIRELESS LOCAL AREA NETWORK DEVICE AND ADAPTER THEREOF

(75) Inventors: Norimitsu Sugiyama, Osaka (JP); Junji Masumoto, Osaka (JP); Atsushi Nakamizo, Osaka (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 12/795,814

(22) Filed: Jun. 8, 2010

(65) Prior Publication Data

US 2010/0309896 A1 Dec. 9, 2010

(30) Foreign Application Priority Data

Jun. 8, 2009 (JP) .................................. 2009-136972

(51) Int. Cl.
*H04L 29/06* (2006.01)

(52) U.S. Cl. ...................... 370/466; 370/310.2; 370/328; 370/349; 370/467; 455/422.1; 709/231; 709/232; 709/236; 709/237

(58) Field of Classification Search ............... 370/310.2, 370/328–339, 349, 466, 467; 455/422.1; 709/231–237

See application file for complete search history.

(56) References Cited

U.S. PATENT DOCUMENTS

| | | | |
|---|---|---|---|
| 6,930,987 B1 | 8/2005 | Fukuda et al. | |
| 6,954,815 B2 | 10/2005 | Kondo | |
| 7,606,946 B2 | 10/2009 | Kobayashi et al. | |
| 2002/0059494 A1 | 5/2002 | Kondo | |
| 2005/0080973 A1* | 4/2005 | Lee | 710/311 |
| 2006/0075174 A1* | 4/2006 | Vuong | 710/302 |
| 2006/0190941 A1 | 8/2006 | Kobayashi et al. | |
| 2007/0055969 A1* | 3/2007 | Yang | 717/168 |
| 2007/0192596 A1 | 8/2007 | Otsuka | |

FOREIGN PATENT DOCUMENTS

| | | |
|---|---|---|
| CN | 1635793 A | 7/2005 |
| CN | 1801709 A | 7/2006 |
| JP | 2001-077878 A | 3/2001 |
| JP | 2002-044184 A | 2/2002 |
| JP | 2002-149623 A | 5/2002 |
| JP | 2004-151785 A | 5/2004 |
| JP | 2005-284953 A | 10/2005 |
| JP | 2005-341315 A | 12/2005 |
| JP | 2005-341345 A | 12/2005 |
| JP | 2006-279848 A | 10/2006 |
| JP | 2007-081542 A | 3/2007 |

OTHER PUBLICATIONS

Japanese Office Action for Application No. 2009-136972, May 10, 2011, Panasonic Corporation.

\* cited by examiner

*Primary Examiner* — Hoon J Chung
(74) *Attorney, Agent, or Firm* — RatnerPrestia

(57) ABSTRACT

A wireless local area network (WLAN) device includes a WLAN adapter having a USB terminal connected to a USB terminal of a PC (personal computer). The WLAN adapter is loaded with a program for setting a WLAN and executing a communication, and a connection of the adapter to the PC prompts the PC to recognize the adapter as a CD-ROM drive, and prompts the program for setting a WLAN and executing a communication to run automatically. The PC loads data of SCSI standard into the WLAN adapter by using a vender defined command of SCSI standard by way of the program for setting a WLAN and executing a communication. The WLAN adapter converts the data of SCSI standard into data for setting a WLAN or data of TCP/IP (Transmission Control Protocol/Internet Protocol), and sets the WLAN and executes the communication.

6 Claims, 3 Drawing Sheets

WIRELESS LOCAL AREA NETWORK DEVICE AND ADAPTER THEREOF

FIELD OF THE INVENTION

The present invention relates to a wireless local area network (hereinafter referred to as WLAN) device that is formed of an information-processing device, e.g. a personal computer, and another information-processing device, e.g. an LCD projector, and these two devices can communicate with each other by WLAN. It also relates to a WLAN adapter to be used in this WLAN device.

BACKGROUND OF THE INVENTION

When a user connects hardware such as a wireless local area network (WLAN) adapter additionally to a personal computer (hereinafter referred to as PC), the user must insert a CD-ROM, one of accessories to the hardware, into a CD-ROM drive of the PC for installing a device driver and software for setting the hardware. The software installation by using the CD-ROM is a cumbersome work for the user, and if the PC has no CD-ROM drive, a CD-ROM drive should be added externally. Solutions to these problems are disclosed in, e.g. Patent Literature 1 and Patent Literature 2.

Patent Literature 1 discloses this: A WLAN adaptor has a function of being detected as a keyboard by a PC, and this WLAN adaptor is connected to a USB terminal of the PC, so that any file in the adapter can be loaded to and executed by the PC. Then the function as a keyboard is changed to a function as a WLAN adapter, so that the adapter can be used as a normal WLAN adapter.

Patent Literature 2 discloses this: A WLAN adapter is equipped with a switch that can switch between a memory device and the WLAN adapter, and the switch is set, at the first place, on the memory device side so that the PC can recognize the adapter as the memory device. Next, a driver software is loaded into the PC by an auto-run program. Then the switch is set on the adapter side so that the WLAN adapter can work as a normal WLAN adapter.

The foregoing patent literatures disclose a USB WLAN adapter to be recognized as another device by a PC for loading driver software stored in the adapter to the PC, or a USB WLAN adapter has the PC run the software automatically for setting a wireless LAN, then the user can use the adapter as a normal WLAN adapter.

However, in a case where another software, which sets a WLAN, has been installed in the PC, the setting is unintentionally and automatically switched, so that an established communication can be sometimes abruptly discontinued. Security software installed in the PC monitors data to be transmitted to the WLAN adapter, so that this security software sometimes blocks the data transmitted/received through WLAN. As a result, a normal communication cannot be expected. For instance, when the security software blocks the data transmitted from the PC to an LCD projector coupled to the PC via WLAN, the communication is interrupted, whereby a video display is unexpectedly discontinued. To avoid such inconvenience, the user should halt the function of the security software temporarily depending on an application of the PC. This is a cumbersome work for the user.

Patent Literature 1: Unexamined Japanese Patent Application Publication Number 2005-284953

Patent Literature 2: Unexamined Japanese Patent Application Publication Number 2005-341315

SUMMARY OF INVENTION

A wireless local area network (WLAN) device of the present invention is formed of a WLAN adapter including a USB terminal connected to a USB terminal of an information processing device. The WLAN adapter stores programs for setting a WLAN and executing a communication. When the WLAN adapter is connected to the information processing device, it is recognized as an optical disk drive by the information processing device so that the programs for setting a WLAN and executing a communication can run automatically. The information processing device then loads the data of SCSI (Small Computer System Interface) standard into the WLAN adapter by using a vender defined command of SCSI standard by way of the programs for setting a WLAN and executing a communication. The WLAN adapter then converts the data of SCSI standard into the data for setting the WLAN and the data of TCP/IP (Transmission Control Protocol/Internet Protocol), thereby setting the WLAN and executing the communication.

The configuration discussed above allows automatically running the programs for setting a WLAN and executing a communication, so that the information processing device (PC) and the WLAN adapter (USB dongle) can be set operably, and the data of TCP/IP can be transmitted and received. The foregoing configuration thus allows users to save supplying the driver software in CD-ROM form for the WLAN adapter or the software in CD-ROM form for setting a WLAN. The WLAN adapter is recognized as a CD-ROM by the information processing device, and data is loaded into the WLAN adapter by using the vender defined commands of SCSI standard, so that the communication cannot be interrupted by the security software stored in the information processing device. As a result, a quality network can be achieved.

The WLAN adapter of the present invention is equipped with a USB terminal to be connected to an information processing device, and comprises the following elements:
 a USB interface;
 programs for setting a wireless LAN and executing a communication;
 an identifier for an optical disk drive;
 a command interpreter for interpreting a vender defined command of SCSI standard;
 a data converter for converting data of SCSI standard into data of TCP/IP; and
 a WLAN interface.

The foregoing structure allows obtaining a WLAN adapter configured as a USB dongle. This adapter is easy to handle and performs a stable wireless communication.

DESCRIPTION OF PREFERRED EMBODIMENT

An exemplary embodiment of the present invention is demonstrated hereinafter with reference to the accompanying drawings.

Exemplary Embodiment

Figure 1:
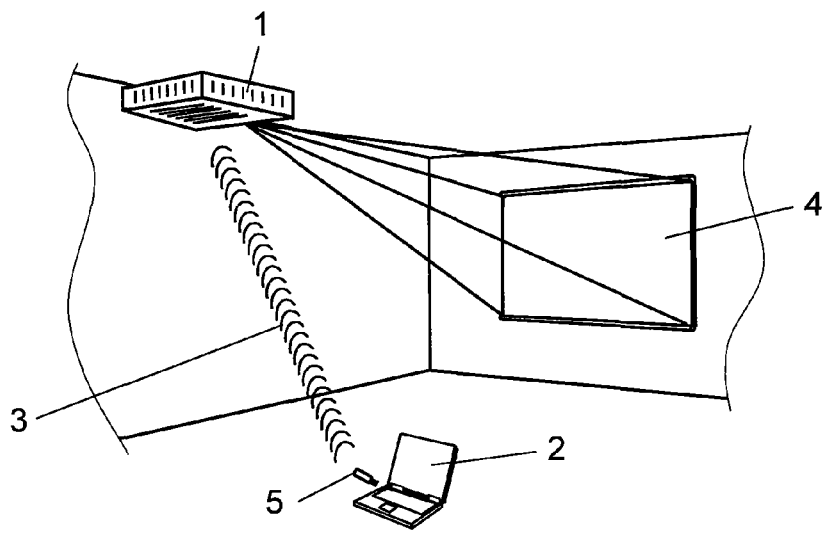
FIG. 1 shows an appearance of a video display system formed of a WLAN (wireless local area network) device of the present invention and an LCD projector.

FIG. 1 shows an appearance of a video display system formed of a WLAN (wireless local area network) device of the present invention and an LCD projector. LCD projector 1 receives information, e.g. presentation material, from PC 2 such as notebook-size personal computer, i.e. information processing device, via radio wave 3, and projects the video of the material onto screen 4. WLAN adapter 5 having a configuration of USB dongle is connected to a USB terminal of PC 2. LCD projector 1 has a WLAN function therein.

Figure 2:
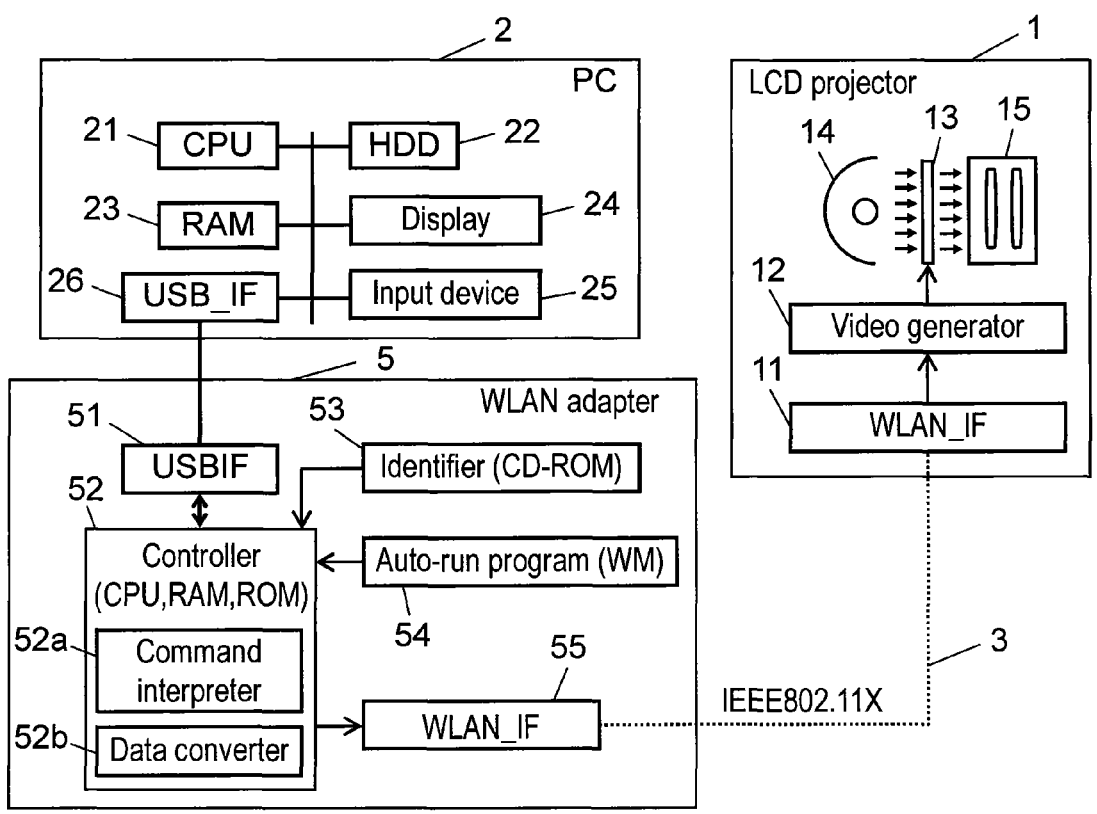
FIG. 2 is a block diagram showing an electrical configuration of a WLAN device and an LCD projector in accordance with an embodiment of the present invention.

FIG. 2 is a block diagram showing an electrical configuration of the WLAN device and the LCD projector in accordance with the embodiment of the present invention. The WLAN device is formed of PC 2 and WLAN adapter 5 configured as USB dongle. This WLAN device and LCD projector 1 form the video display system. PC 2 includes CPU 21 as a core element working as control means, HDD (hard disk drive) 22, RAM (random access memory) 23 working as main memory, display 24 working as display means, input device 25 such as keyboard or mouse, and USB_IF (USB interface) 26.

WLAN adapter 5 comprises the following elements:
USB_IF 51 for communicating with PC 2;
controller 52;
identifier 53;
auto-run program 54; and
WLAN_IF 55.

Controller 52 is formed of CPU, RAM, ROM, and supports the communication between adapter 5 and PC 2. Controller 52 includes command interpreter 52a for interpreting commands of SCSI (small computer system interface) standard (hereinafter simply referred to as SCSI commands), and data converter 52b for converting data of SCSI standard (hereinafter simply referred to as SCSI data) into TCP/IP data and outputting the resultant data to WLAN_IF 55. Identifier 53 has PC 2 recognize WLAN adapter 5 as a CD-ROM drive, and includes an ID of CD-ROM, model number, serial number, and the information about the manufacturer. Hookup of WLAN adapter 5 to the USB terminal of PC 2 allows controller 52 to transmit identifier 53 to PC 2.

Auto-run program 54 includes software for setting a WLAN and for executing a communication. This software connects LCD projector 1 to PC 2 wirelessly and is called a wireless manager in general. Hookup of WLAN adapter 5 to the USB terminal of PC 2 prompts controller 52 to load auto-run program 54 into RAM 23 of PC 2, and program 54 runs automatically. Identifier 53 and auto-run program 54 are actually stored in the ROM or a flash memory (not shown) of controller 52.

WLAN_IF 55 transmits the TCP/IP data to LCD projector 1 wirelessly.

LCD projector 1 comprises the following elements:
WLAN_IF 11 for allowing wireless communication between projector 1 and WLAN adapter 5;
video generator 12 for generating videos from TCP/IP data received by WLAN_IF 11;
LCD panel 13 for displaying videos;
light source 14; and
projection lens 15 for enlarging and projecting videos on screen 4 therethrough by modulating the light supplied from light source 14 with the videos transmitted from PC2.

The operation of the WLAN device in accordance with this embodiment is demonstrated hereinafter with reference to FIG. 2-FIG. 4. For a simpler description purpose, PC 2 in FIG. 2 is simply referred to as PC and WLAN adapter 5 in FIG. 2 is simply referred to as dongle or USB dongle.

Figure 3:
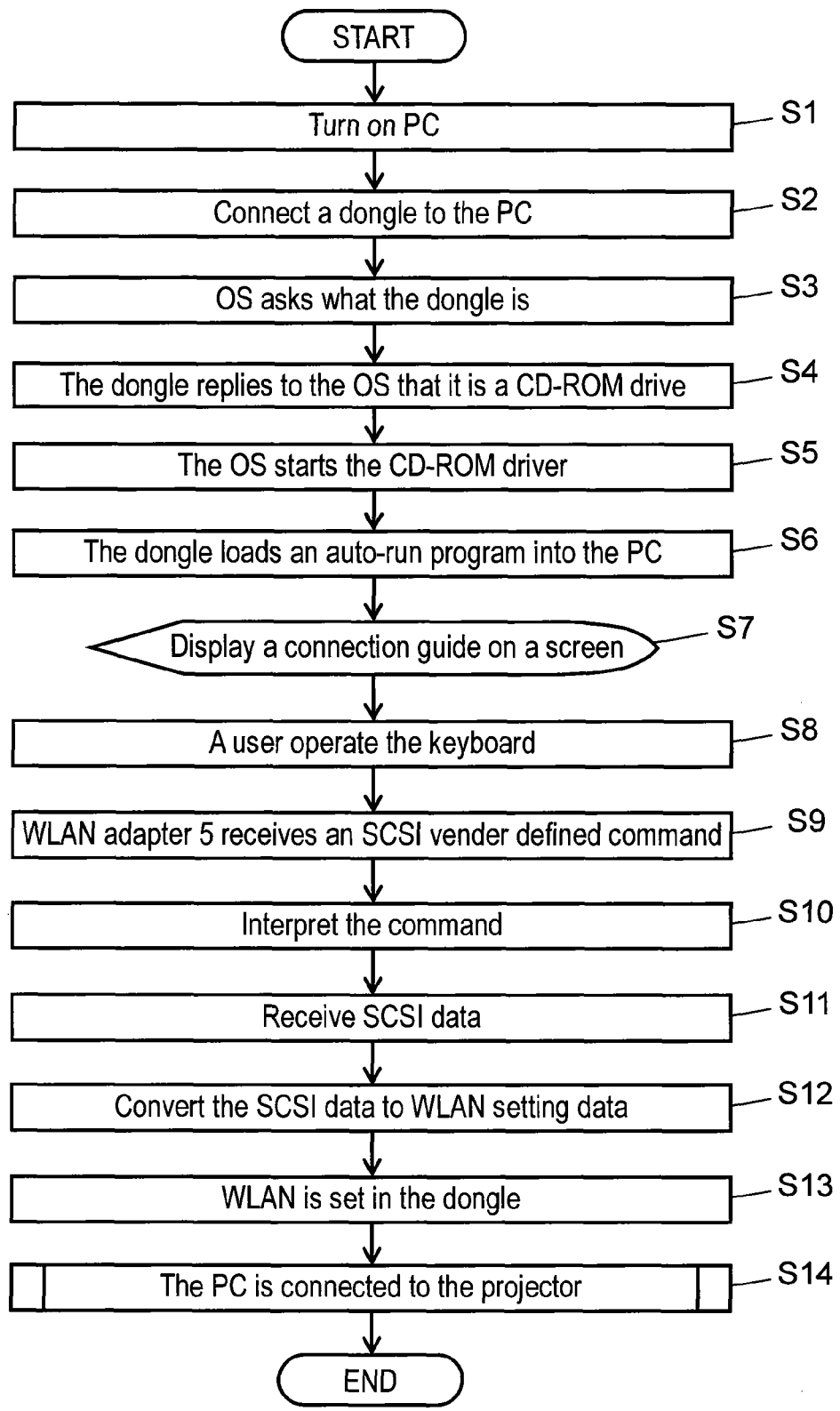
FIG. 3 is a flowchart showing how to set a WLAN for the WLAN device in accordance with an embodiment of the present invention.

FIG. 3 is a flowchart illustrating how to set the WLAN in the PC. First, as a preparation step, LCD projector 1 is powered so that WLAN_IF 11 can be activated. Then turn on the PC in step S1, and connect the dongle to a USB terminal of the PC in step S2, which prompts an OS (operation system) monitoring the USB terminal to detect the connection, and the OS asks a question in step S3 what the dongle is.

In response to this question, the dongle transmits the content of identifier 53 to the PC (OS) in step S4, in other words, the dongle answers the question to the OS that the dongle is a CD-ROM drive. Then using the information of identifier 53, the OS searches whether or not the driver software for the drive is available in its own file. In general, PCs are installed with driver software for a CD-ROM drive, so that the PC starts the driver software for the CD-ROM drive in next step S5.

Next, in step S6, the dongle loads a file of auto-run program 54 to the PC. This file is developed in RAM 23 of the PC, then in step S7, the wireless manager starts, thereby displaying a connection guide on display 24. In step S8, a user operates input device 25 so that WLAN is set. To be more specific, since PC 2 recognizes WLAN adapter 5 as a CD-ROM drive, commands and data are exchanged between PC 2 and adapter 5 based on SCSI protocol.

The CD-ROM drive is exclusively used for readout of data, so that no write command, which instructs PC 2 to set the WLAN or to transmit data to WLAN adapter 5, is available. In this embodiment, a vendor defined command, which allows even a CD-ROM drive to be loaded with data, is used for allowing PC 2 to transmit the data to WLAN adapter 5.

Even if PC 2 is installed with the WLAN setting software or security software, the foregoing structure thus can eliminate an interruption of data transmission. The interruption may be otherwise invited by a forcible switch of the WLAN setting switched by WLAN utility software or by the security software. In step S9, WLAN adapter 5 receives a vendor defined command of SCSI standard from PC 2, and in step S10, the command is interpreted by command interpreter 52a of controller 10 for being ready to receive data.

Next, in step S11, adapter 5 receives SCSI data transmitted from PC 2, then data converter 52b of controller 52 receives this SCSI data and converts it into WLAN data in step S12, and the WLAN is set to WLAN_IF55 in step S13. As a result, LCD projector 1 is connected to PC 2 wirelessly.

Figure 4:
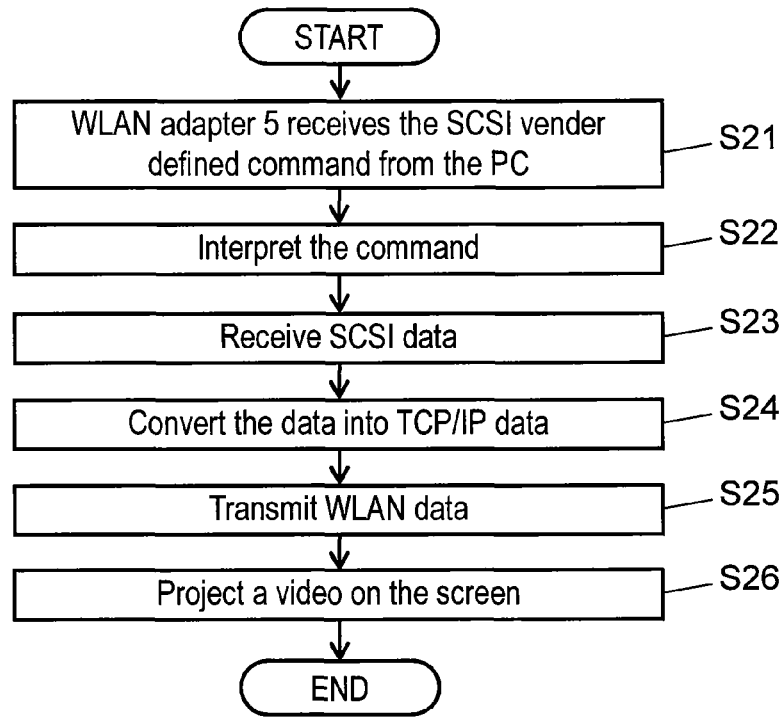
FIG. 4 is a flowchart showing how the WLAN device transmits data in accordance with an embodiment of the present invention.

FIG. 4 is a flowchart illustrating the data transmission from PC 2 to LCD projector 1. In step S21 shown in FIG. 4, WLAN adapter 5 receives vender defined data of SCSI standard from PC 2. Command interpreter 52a of controller 52 then interprets the vender defined command in step S22, thereby preparing for data reception. Next, in step S23, adapter 5 receives the SCSI data transmitted from PC 2. Data converter 52b of controller 52 receives this SCSI data and converts it to TCP/IP data in step S24. WLAN_IF 55 then transmits the data wirelessly to LCD projector 1 in step S25, and then LCD projector 1 projects a video onto a screen in step S26.

Next, a method for preventing application software stored in PC 2 from using the USB dongle in unauthorized manner is demonstrated hereinafter. Before the use of the USB dongle, the application software of PC 2 and the USB dongle mutually authenticate each other. A general digest authentication is used for this mutual authentication between PC 2 and the USB dongle. Since the digest authentication is widely used, the description thereof is omitted here. The WLAN device in accordance with this embodiment adds the digest value, used for the mutual authentication, as an ID to the communication data, which is transmitted with the ID to the receiver (either one of PC 2 or dongle), who accepts the data when the received ID agrees with the digest value stored by the receiver, on the other hand, when the ID does not agree with the digest value, the receiver neglects the data.

Figure 5:
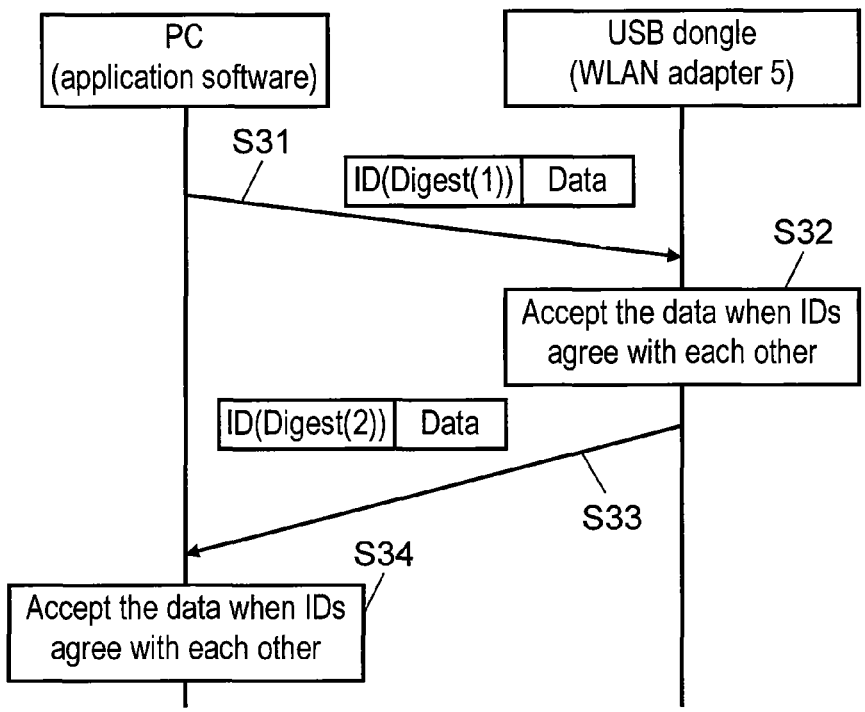
FIG. 5 shows how to authenticate the WLAN device in accordance with an embodiment of the present invention.

FIG. 5 is a flowchart illustrating an authentication process between the application software stored in PC 2 and the USB dongle. PC 2 adds the digest value as an ID, i.e. Digest (1), to the data. This digest value has been used for authenticating the USB dongle. PC 2 transmits this data with the ID to the USB dongle in step S31. Then the USB dongle determines in step S32 whether or not the received ID agrees with its own digest value, i.e. Digest (1), and when the ID agrees with the digest value, the USB dongle accepts the data. When they do not agree with each other, the USB dongle neglects the data. In a similar way, in step S33, the USB dongle adds the digest value, i.e. Digest (2) as an ID to the data, where this digest value has been used for authenticating PC 2, and sends this data with the ID to PC 2. In step S34, PC 2 determines whether or not the received ID agrees with its own digest value, i.e. Digest (2), and when the ID agrees with Digest (2), PC 2 accepts the data, and when they do not agree with each other, PC 2 neglects the data.

The foregoing mechanism allows preventing unauthenticated application software from using the USB dongle in unauthorized manner.

The foregoing demonstration proves that WLAN adapter 5 is recognized as a CD-ROM drive, so that the programs stored in adapter 5 for setting a WLAN and executing a communication can be automatically run. As a result, no conflict occurs between the foregoing programs and the WLAN setting software loaded in PC 2. Since PC 2 transmits SCSI data, the security software loaded in PC 2 allows this data to pass, no interruption occurs in video transmission to the LCD projector. As a result, projection videos are not interrupted at all. On top of that, mutual authentication can be done between WLAN adapter 5 and the application software loaded in PC 2, so that the application software can be prevented from using WLAN adapter 5 (USB dongle) in unauthorized manner.

In the embodiment discussed above, PC 2 recognizes WLAN adapter 5 as a CD-ROM drive; however, it is not necessarily to recognize adapter 5 to be a CD-ROM drive. Adapter 5 can be recognized as another optical disk drive such as DVD drive.

What is claimed is:

1. A wireless local area network (WLAN) device comprising a WLAN adapter including a USB terminal connected to a USB terminal of an information processing device, wherein the WLAN adapter stores a program for setting a WLAN and executing a communication, wherein a connection of the WLAN adapter to the information processing device prompts the information processing device to recognize the adapter as an optical disk drive, and prompts the program for setting a WLAN and executing a communication to run automatically, wherein the information processing device loads data of SCSI (Small Computer System Interface) standard into the WLAN adapter by way of the program for setting a WLAN and executing a communication by using a vender defined command of SCSI standard, and wherein the WLAN adapter converts the data of SCSI standard into data for setting a WLAN and data of TCP/IP (Transmission Control Protocol/Internet Protocol), and sets the WLAN and executes the communication.

2. The WLAN device of claim 1, wherein the WLAN adapter and application software loaded into the information processing device mutually authenticate each other by using digest authentication, wherein a digest value used for the mutual authentication is added as an ID to data in transmitting the data, and the data is accepted by a receiver only when the ID agrees with a digest value stored in the receiver.

3. The WLAN device of claim 2, wherein the optical disk drive is a CD-ROM drive.

4. The WLAN device of claim 1, wherein the optical disk drive is a CD-ROM drive.

5. A wireless local area network (WLAN) adapter including a USB terminal to be connected to an information processing device, the WLAN adapter comprising:
a USB interface;
a program for setting a WLAN and executing a communication;
an identifier for an optical disk drive;
a command interpreter for interpreting a vender defined command of SCSI (Small Computer System Interface) standard;
a data converter for converting data of SCSI standard into data for setting a WLAN and data of TCP/IP (Transmission Control Protocol/Internet Protocol); and
a WLAN interface.

6. The WLAN adapter of claim 5, wherein the optical disk drive is a CD-ROM drive.

* * * * *